United States Patent
Leibner et al.

(10) Patent No.: US 11,237,273 B2
(45) Date of Patent: Feb. 1, 2022

(54) GPS SPOOFING DETECTION TECHNIQUES

(71) Applicant: The MITRE Corporation, McLean, VA (US)

(72) Inventors: Darrow Paine Leibner, Arlington, VA (US); Erik T. Lundberg, McLean, VA (US)

(73) Assignee: THE MITRE CORPORATION, McLean, VA (US)

( * ) Notice: Subject to any disclaimer, the term of this patent is extended or adjusted under 35 U.S.C. 154(b) by 0 days.

(21) Appl. No.: 16/532,672

(22) Filed: Aug. 6, 2019

(65) Prior Publication Data

US 2019/0361130 A1 Nov. 28, 2019

Related U.S. Application Data

(63) Continuation of application No. 14/179,607, filed on Feb. 13, 2014, now Pat. No. 10,495,759.

(51) Int. Cl.
*G01S 19/21* (2010.01)
*H04K 3/00* (2006.01)

(52) U.S. Cl.
CPC ............ *G01S 19/215* (2013.01); *H04K 3/224* (2013.01); *H04K 3/255* (2013.01); *H04K 3/65* (2013.01); *H04K 3/90* (2013.01)

(58) Field of Classification Search
CPC ...... G01S 19/215; H04K 3/224; H04K 3/255; H04K 3/65; H04K 3/90
See application file for complete search history.

(56) References Cited

U.S. PATENT DOCUMENTS 5,557,284 A * 9/1996 Hartman ............... G01S 19/215
                                                    342/352
5,995,042 A * 11/1999 Durboraw, III ....... G01S 19/215
                                                    342/357.58

(Continued)

FOREIGN PATENT DOCUMENTS

EP       1 489 432 B1    5/2008
WO   WO 2013/043851 A1   3/2013

OTHER PUBLICATIONS

Mosavi, M.R. et al., "Use of Accurate GPS Timing based on Radial Basis Probabilistic Neural Network in Electric Systems," IEEE, *2010 International Conference on Electrical and Control Engineering*, pp. 2572-2575 (2010).

(Continued)

*Primary Examiner* — Marcus E. Windrich
(74) *Attorney, Agent, or Firm* — Sterne, Kessler, Goldstein & Fox P.L.L.C.

(57) ABSTRACT

Disclosed herein are system, method, and computer program product embodiments for detecting spoofing of a navigation device. A plurality of anti-spoofing techniques are provided. The plurality of anti-spoofing techniques detect interference with data provided by one or more navigation devices for a plurality of threat situations. Positioning, timing and frequency characteristics associated with the one or more navigation devices are analyzed in order to identify a threat situation among the plurality of threat situations. Based on the identified threat situation one or more of the anti-spoofing techniques are executed. The one or more anti-spoofing techniques can be executed in parallel in order to provide various anti-spoofing detection techniques at the same time.

20 Claims, 13 Drawing Sheets

(56) References Cited

U.S. PATENT DOCUMENTS

| | | | |
|---|---|---|---|
| 6,067,484 A * | 5/2000 | Rowson | G01S 19/15 342/357.29 |
| 7,250,903 B1 * | 7/2007 | McDowell | G01S 19/215 342/357.59 |
| 7,471,238 B2 | 12/2008 | Lillo et al. | |
| 7,764,224 B1 * | 7/2010 | Anderson | G01S 19/215 342/357.27 |
| 7,912,643 B1 * | 3/2011 | Bean | G01S 19/215 701/470 |
| 7,956,803 B2 * | 6/2011 | Thomson | G01S 19/215 342/357.59 |
| 7,969,354 B2 * | 6/2011 | Levin | G01S 19/08 342/357.59 |
| 8,253,624 B2 | 8/2012 | King et al. | |
| 8,624,779 B2 * | 1/2014 | Ferguson | G01S 19/04 342/357.58 |
| 9,541,649 B2 | 1/2017 | Leibner et al. | |
| 9,632,183 B2 | 4/2017 | Zehnpfennig et al. | |
| 2004/0257275 A1 | 12/2004 | Yee et al. | |
| 2005/0146459 A1 * | 7/2005 | Dentinger | G01S 19/215 342/357.58 |
| 2007/0075896 A1 * | 4/2007 | Whitehead | G01S 19/53 342/357.36 |
| 2007/0285309 A1 | 12/2007 | Atkinson | |
| 2009/0069960 A1 | 3/2009 | Lapp et al. | |
| 2009/0257321 A1 | 10/2009 | Scott et al. | |
| 2010/0045506 A1 | 2/2010 | Law et al. | |
| 2011/0068973 A1 * | 3/2011 | Humphreys | G01S 19/215 342/357.3 |
| 2011/0080319 A1 | 4/2011 | Abraham et al. | |
| 2011/0102259 A1 * | 5/2011 | Ledvina | G01S 19/215 342/357.59 |
| 2011/0181466 A1 | 7/2011 | Serrano et al. | |
| 2011/0227787 A1 * | 9/2011 | Gum | G01S 5/0215 342/357.28 |
| 2011/0285586 A1 | 11/2011 | Ferguson | |
| 2011/0287779 A1 * | 11/2011 | Harper | H04W 4/025 455/456.1 |
| 2012/0019411 A1 * | 1/2012 | Trauten | G01S 19/41 342/357.24 |
| 2012/0041620 A1 | 2/2012 | Stayton et al. | |
| 2012/0072112 A1 * | 3/2012 | Bagnall | G01S 19/27 701/531 |
| 2013/0002477 A1 * | 1/2013 | Dehnie | G01S 19/47 342/357.3 |
| 2014/0035783 A1 * | 2/2014 | Contarino | G01S 19/215 342/357.59 |
| 2014/0097984 A1 * | 4/2014 | Stevens | G01S 19/20 342/357.58 |
| 2014/0152498 A1 | 6/2014 | Scheitlin et al. | |
| 2014/0327573 A1 | 11/2014 | Leibner et al. | |
| 2014/0327574 A1 * | 11/2014 | Achanta | H04K 3/22 342/357.59 |
| 2015/0097721 A1 * | 4/2015 | Broussalian | G01S 19/015 342/357.2 |
| 2015/0116147 A1 * | 4/2015 | Jaeckle | G01S 19/015 342/357.59 |
| 2015/0226857 A1 * | 8/2015 | Davies | G01S 19/215 342/357.59 |
| 2015/0226858 A1 | 8/2015 | Leibner et al. | |
| 2015/0234053 A1 * | 8/2015 | Psiaki | G01S 19/215 342/357.51 |
| 2015/0268350 A1 | 9/2015 | Whitehead | |
| 2015/0293234 A1 | 10/2015 | Snyder et al. | |
| 2016/0154112 A1 * | 6/2016 | Nichols | G01S 19/215 342/357.47 |

OTHER PUBLICATIONS

Vyskočil, P. and Šebesta, J., "Relative Timing Characteristics of GPS Timing Modules for Time Synchronization Application," IEEE, *IWSSC 2009*, 5 pages (2009).

Warner, J.S. and Johnston, R.G., "GPS Spoofing Countermeasures," *Homeland Security Journal*, 7 pages (Dec. 12, 2003).

Wesson, K. D. et al., "A Combined Symmetric Difference and Power Monitoring GNSS Anti-Spoofing Technique," *Preprint of the 2013 IEEE Global Conference on Signal and Information Processing (GlobalSIP)*. Austin, TX. 4 pages (Dec. 3-5. 2013).

Zhang, Z. et al., "Time Synchronization Attack in Smart Grid—Part II: Cross Layer Detection Mechanism." *IEEE, IEEE Transaction On Smart Grid*. 8 pages (Apr. 2, 2012).

Extended European Search Report for European Patent Appl. No. 15154811.2, 6 pages, dated Dec. 8, 2015.

* cited by examiner

GPS SPOOFING DETECTION TECHNIQUES

CROSS REFERENCE TO RELATED APPLICATIONS

This application claims priority to U.S. patent application Ser. No. 14/179,607, filed on Feb. 13, 2014, which is herein incorporated by reference in its entirety.

BACKGROUND

Digital systems rely on timing subsystems in order to operate properly. Such timing subsystems are vulnerable to anomalies, which are difficult to detect.

When dealing with network security including digital systems, anomalies can be the result of a spoofing attack. A spoofing attack is a technique used by a hacker or attacker to masquerade or falsify data, unknown to users of the digital system.

A Global Navigation Satellite System (GNSS) spoofing attack involves an attempt by a hacker to trick a GNSS receiver, such as a Global Positioning System (GPS) receiver, by broadcasting a signal which is different than the signals received from GPS satellites. The broadcasted signals are designed to appear as normal or standard GPS signals. However, the spoofed signals are modified in such a manner to cause the GPS receiver to produce bad time or timing intervals and/or produce a position at a location determined by the attacker, as opposed to the actual UTC time or the receiver's actual location. Thus, the goal of spoofing in this example is to provide a GPS receiver with a misleading signal and therefore deceive the receiver to use fake signals for positioning and timing calculations, which will not be accurate.

The reliance on GPS within civil infrastructure is an inherent security vulnerability. Individuals, groups, or nations interested in causing harm can target a GPS reliant system, thereby disrupting or disabling swaths of infrastructure including national critical infrastructure such as the financial and power industries, as well as cellular communication systems and automated teller machines (ATMs). In particular, the concern is over GPS spoofing, an insidious form of intentional interference whereby a spoofer transmits counterfeit GPS signals to an unsuspecting (and unprotected) receiver. Spoofing is more malignant than jamming, because current civil receivers trust all GPS signals to be true, and therefore cannot warn the user, much less take evasive action, when confronted with counterfeit signals.

While the GPS P-code is encrypted and thus, is difficult to spoof, the civilian GPS signal, the C/A code, is relatively easier to spoof because the signal structure, the spread spectrum codes, and modulation methods are open to the public. Insecure civil GPS technology has recently been utilized by critical systems, such as military vehicles, communications systems, banking and finance institutions and the power grid. Consequently, these systems can be severely compromised when subject to a spoofing attack resulting in positioning or timing anomalies.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

Embodiments are described, by way of example only, with reference to the accompanying drawings. Further, the accompanying drawings, which are incorporated herein and form part of the specification, illustrate the embodiments of the present disclosure and, together with the description, further serve to explain the principles of the disclosure and to enable a person skilled in the relevant art(s) to make and use embodiments thereof.

DETAILED DESCRIPTION

Provided herein are system, method and/or computer program product embodiments, and/or combinations and sub-combinations thereof, for detecting timing anomalies within systems, such as but not limited to digital systems.

While the present disclosure is described herein with reference to illustrative embodiments for particular applications, it should be understood that embodiments are not limited thereto, Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
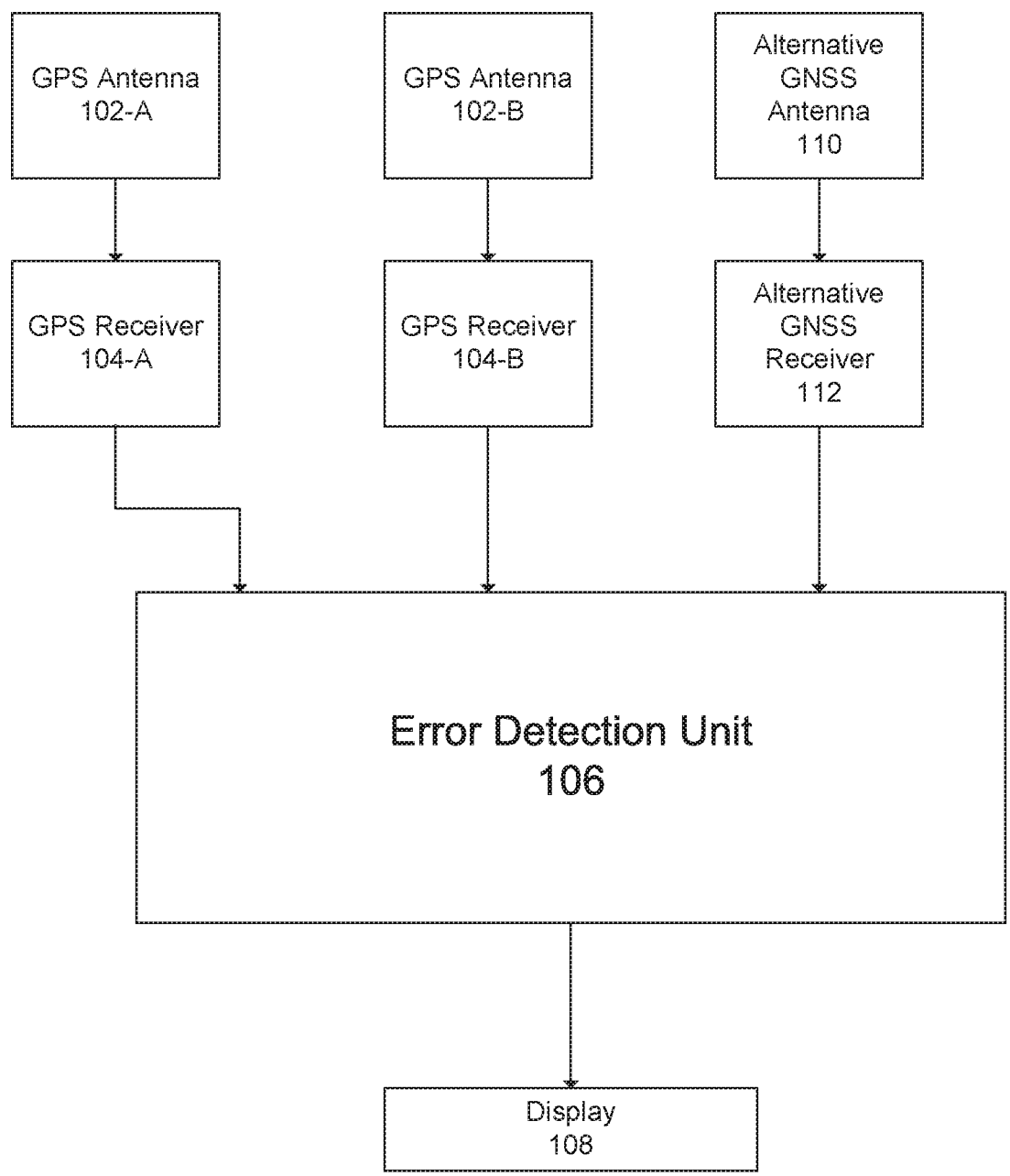
FIG. 1 is a block diagram of a GPS error detection system, according to an example embodiment.

FIG. 1 is a block diagram illustrating a GPS error detection system 100, which provides real-time protection of timing and position based digital systems, according to an embodiment. GPS error detection system includes a plurality of GPS antennas 102-A, 102-B, a plurality of GPS receivers 104-A, 104-B, an alternative GNSS antenna 110, an alternative GNSS receiver, 112, an error detection unit 106, and a display 108. GPS receivers 104 are configured to measure the relative time delay of signals from the plurality of GPS satellites or antennas 102. In general, the plurality of GPS antennas 102 and the alternative GNSS antenna 110 can each include onboard cesium atomic clocks. The relative time delay of signals are transformed into absolute spatial coordinates and a time coordinate by GPS receivers 104 and alternative GNSS receiver 112. GPS receivers 104 and alternative GNSS receiver 112 can be compromised by a targeted attack, such as a spoofing attack. Such an attack can attempt to modify the associated time coordinates or spatial coordinates, for example, which can result in inaccurate signal information from GPS receivers 104 and alternate GNSS receiver 112.

Embodiments are aimed at providing a suite or plurality of error detection or anti-spoofing techniques (or any combination thereof) which can detect interference with signal information from GPS receivers 104 and alternative GNSS receiver 112. The plurality of error detection techniques are capable of detecting interference based on a plurality of different kinds of time-based and position-based threat situations associated with the plurality of GPS antennas 102, the plurality of GPS receivers 104, the alternative GNSS antenna 110, and the alternative GNSS antenna 112. The error detection techniques can include interference detection techniques based on the position reported by GPS receivers 104 and alternative GNSS receiver 112, a timing measurement reported by GPS receivers 104 and alternative GNSS receiver 112, and power measurements associated with the plurality of GPS antennas 102, the plurality of GPS receivers 104, the alternative GNSS antenna 110, and the alternative GNSS receiver 112. Further discussion of the different kinds of detection techniques provided by error detection unit 106 is discussed below. Once one or more compromised navigation devices among the plurality of GPS receivers 104 and alternative GNSS receiver 112 are detected, error detection unit 106 is configured to execute one or more anti-spoofing techniques based on an identified threat situation associated with the one ore more compromised navigation devices. When an anti-spoofing technique is executed, error detection unit 106 is configured to generate an alert or message to a network operator, via display 108, to indicate that there is a discrepancy with at least one characteristic of the GPS receivers 104, such as timing signals, spatial coordinates and signal power strength. In this way, a network operator is provided real-time information regarding errors detected by error detection unit 106 and is immediately alerted to discrepancies, which may serve as an indicator of a compromised system or network.

Error Detection Techniques

Figure 2:
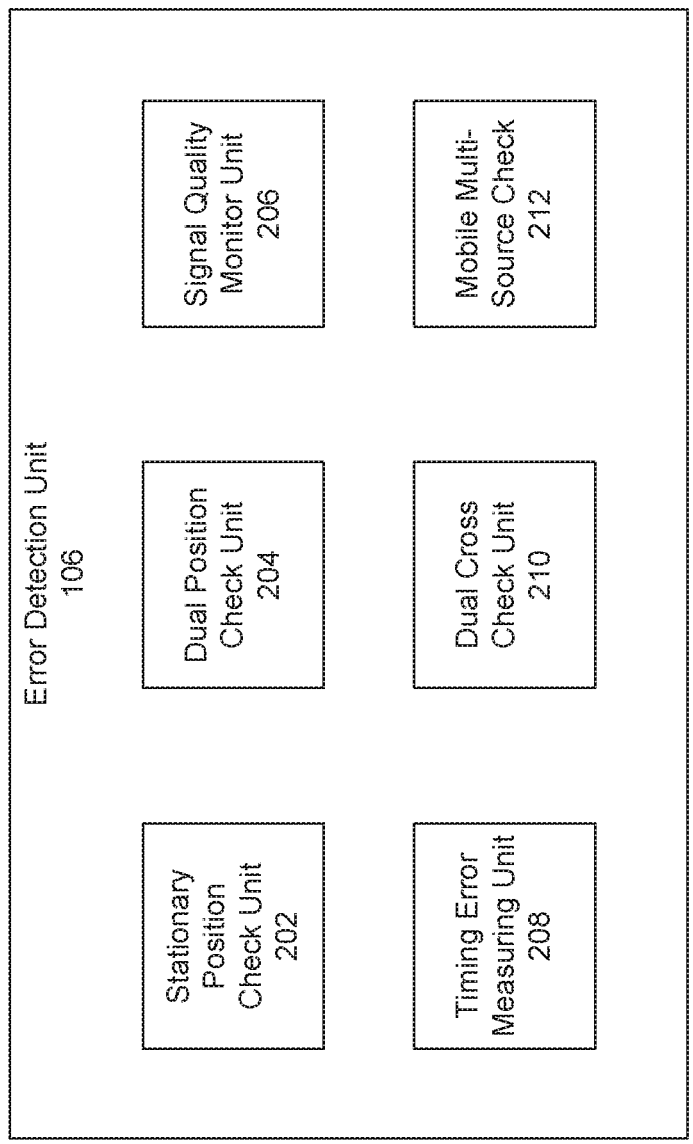
FIG. 2 is a block diagram of anti-spoofing modules implemented by an error detection unit, according to an example embodiment.

As discussed above, error detection unit 106 provides a plurality of anti-spoofing techniques for the plurality of navigation devices, such that the plurality of anti-spooling techniques detect interference with data associated with the plurality of navigation devices for a plurality of threat situations. FIG. 2 illustrates various anti-spoofing modules implemented by error detection unit 106. Error detection unit 106 includes a stationary position check unit 202, a dual position check unit 204, a signal quality monitor unit 206, a timing error measuring unit 208, a dual GNSS cross check unit 210, and a mobile multi-source check unit 212. Details of the different kinds of error detection techniques and the associated processing modules provided by error detection unit 106 are presented below. The different kinds of error detection techniques discussed herein are not intended to be limiting, and a person or ordinary skill in the art would recognize that additional error detection techniques may be provided by error detection unit 106.

Stationary Position Check Unit

Figure 3:
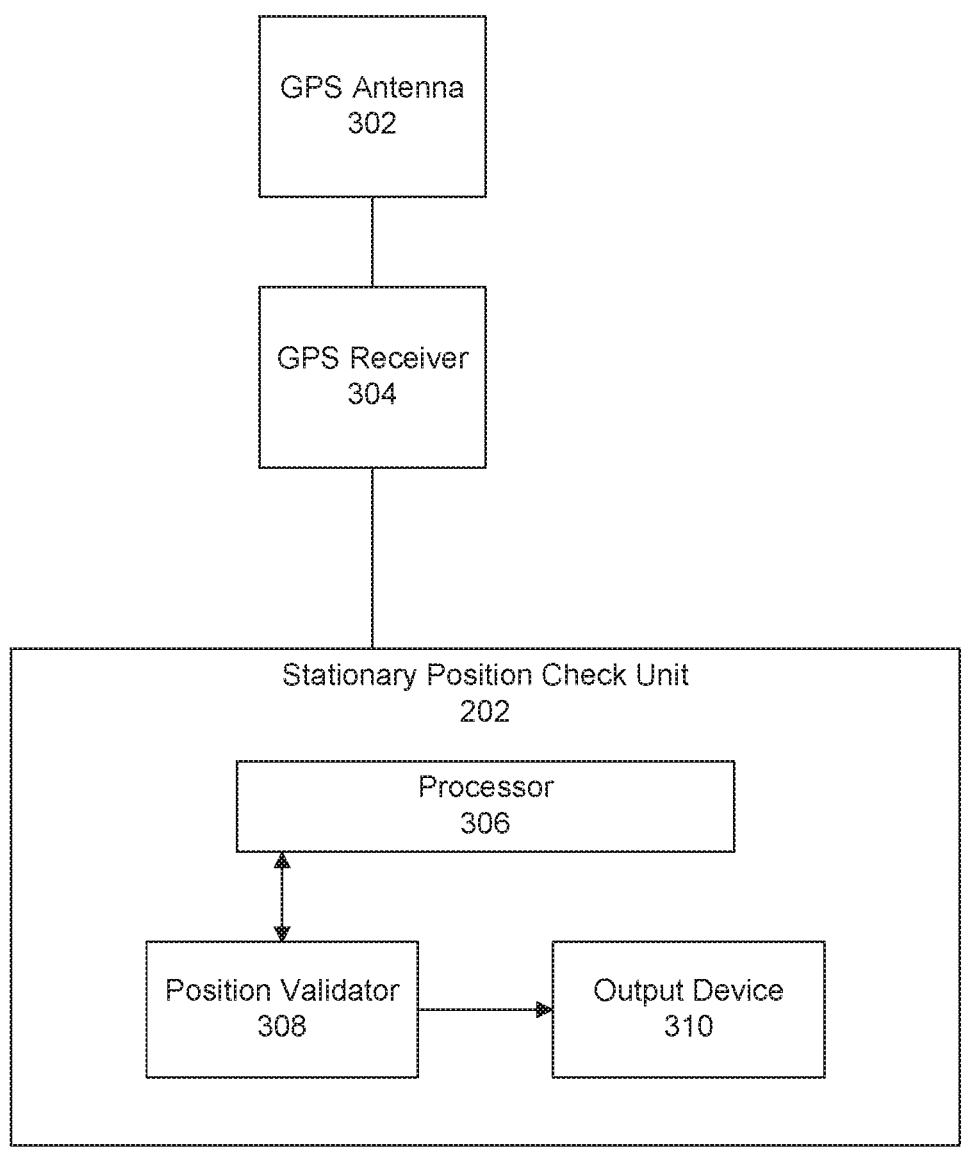
FIG. 3 is a block diagram of a stationary position check unit, according to an example embodiment.

FIG. 3 illustrates stationary position check unit 202 within a system 300. Stationary position check unit 202 includes a processor 306, a position validator 308, and an output device 310.

Stationary position check unit 202 can be software, firmware, or hardware or any combination thereof in a computing device. Stationary position check unit 208 can be implemented on or implemented with one or more client computing devices. A client computing device can be any type of computing device having one or more processors and memory. For example, a client computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A client computing device may include a communication port or I/O device for communicating over wired or wireless communication link(s).

Stationary position check unit 202 is configured to receive data from GPS receiver 304. GPS receiver 304 is configured to measure the relative time delay of signals from a plurality of GPS satellites or antennas 302. In general, the plurality of GPS antennas 302 can each include onboard cesium atomic clocks. The relative time delay of signals are transformed into absolute spatial coordinates and a time coordinate by GPS receiver 304.

In one example, processor 306 can be a microprocessor, a digital signal processor, a state machine, or the like, which processes data received from an unvalidated data source, such as GPS receiver 304, while under control of underlying firmware, software, or both. In another example, processor 306 can be part of a computer system, as would be apparent to a skilled artisan. Alternatively or additionally, additional hardware components can be used to perform one or more of the operations discussed below.

In an embodiment, stationary position check unit 202 is configured to receive data from a distributed coordinated time source, such as GPS receiver 304 or another type of GNSS. Such distributed coordinated time sources are vulnerable to attacks from hackers or adversaries who may attempt to modify or spoof a data signal from GPS antenna 302. An alteration or spoofing of the signal from a GNSS could result in a compromised system that does not operate as intended. According to an embodiment processor 306 is configured to process the data received from GPS receiver 304 in order to determine a reported position of the GPS receiver 304. The reported position of GPS 304 is the current absolute spatial coordinates as determined by GPS receiver 304 In an embodiment, position validator 308 is configured to compare the reported position from GPS receiver 304 to a surveyed-in position of the GPS receiver 304. In an embodiment, GPS antenna 302 and GPS receiver 304 are stationary, Therefore, the position and spatial coordinates reported by GPS receiver 304 are known, fixed and unchanged. The known, fixed position and spatial coordinates associated with GPS antenna 302 and GPS receiver 304 is identified as the surveyed-in position. In this way any difference between the reported position of GPS receiver 304 and the surveyed in position of GPS receiver 304 may indicate that GPS receiver 304 has been compromised by a spoofer.

Figure 4:
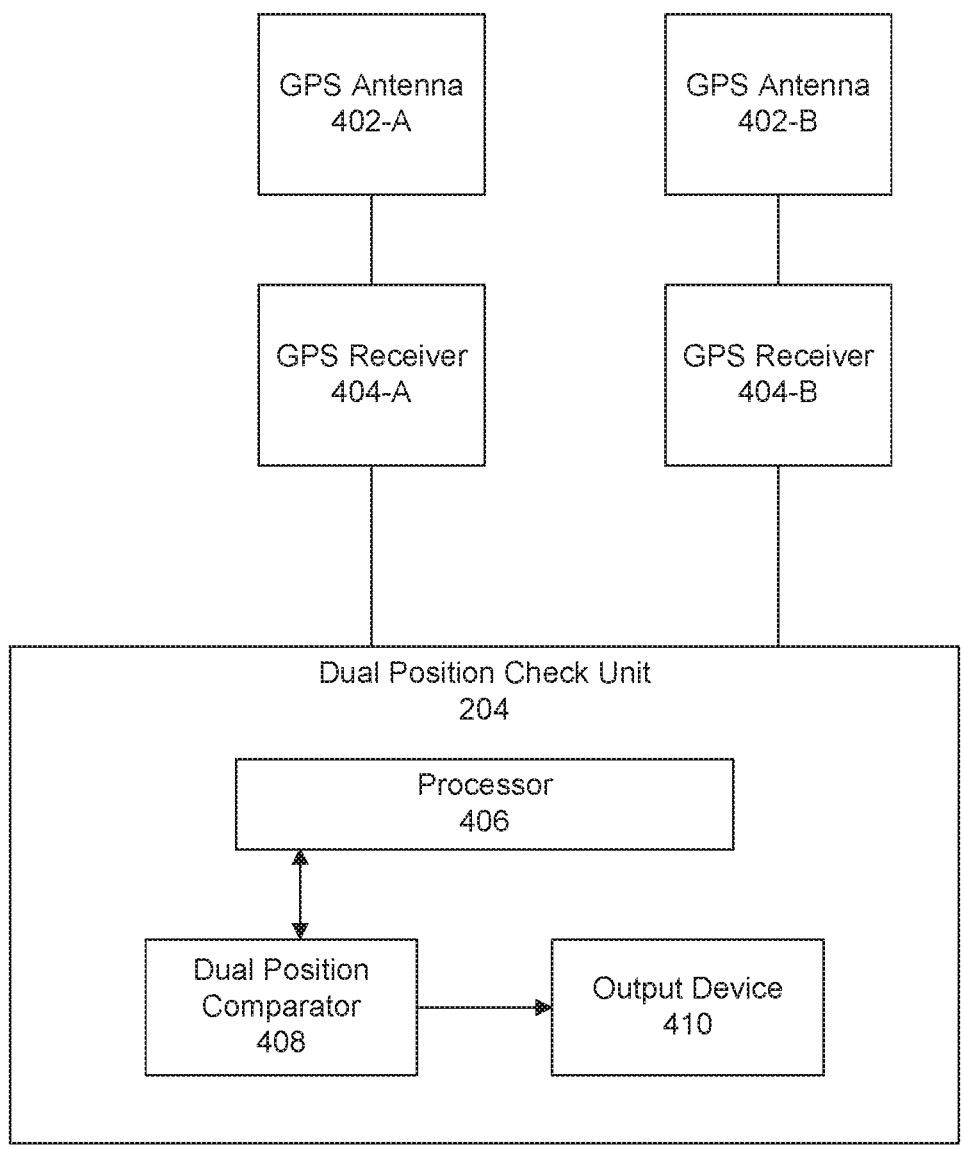
FIG. 4 is a block diagram of a dual position check unit, according to an example embodiment.

In an embodiment, position validator 308 is configured to determine if there is a difference or mismatch between the reported position of GPS receiver 304 and the surveyed-in position of GPS receiver 304. If a mismatch has been determined or the difference is outside an acceptable positional range, then a threat-alert is generated by position validator 308 and sent to output device 310. The threat-alert indicates that the transmission signal of GPS receiver 304 may be compromised. That is, the transmission signal may not be the true signal generated by GPS receiver 304, but instead may be a spoofed signal from a GPS spoofer that has taken over the output of the GPS receiver 304. In such a scenario, the reported position of GPS receiver 304 may correspond to the position of the GPS spoofer and not the actual position that should be reported by GPS receiver 304. Thus, the discrepancy in the reported position serves as an indicator to a network operator that GPS receiver 304 is compromised and allows the operator to activate the necessary defense mechanisms against the GPS spoofing attack, Dual Position Check Unit FIG. 4 illustrates dual position check unit 204 within a system 400. Dual position check unit 204 includes a processor 406, a multi-position comparator 408 and an output device 410. Dual position check unit 204 can be software, firmware, or hardware or any combination thereof in a computing device. Dual position check unit 204 can be implemented on or implemented with one or more client computing devices.

Dual position check unit 204 is configured to receive data from GPS receivers 404-A and 404-B. The data received from GPS receivers 404 is related to their respective GPS antennas 402-A and 402-B. Dual position check unit 204 leverages known information about GPS receivers 404-A and 404-B and their relationship in order to detect a potential GPS spoofing attack, according to an embodiment. For example, dual position check unit 204 is aware of the surveyed in positions of GPS receiver 404-A and 404-B respectively. The surveyed-in positions of GPS receivers 404-A and 404-B are identified similarly to the surveyed-in positions of GPS receiver 304 of FIG. 3, as described above. When a system is compromised by a spoofing attack, the GPS spoofer will only provide one spoofing signal. Accordingly, such a spoofing signal will only have one position to report. Dual position check unit 204 is configured to take advantage of this characteristic of a GPS spoofing signal. If system 400 is compromised by a spoofing attack, since the spoofer will only output coordinates associated with a singular position all GPS receivers 404, which are solely tracking the signals from the spoofer, will report the same position. In this way, dual position check unit 204 is configured to detect such a spoofing attack by comparing the reported distance between GPS antennas 402-A and 402-B against a predetermined and known distance, according to embodiments. When the reported distance is below a preconfigured distance threshold, spoofing is detected.

In an embodiment, dual position check unit 204 is configured to receive a plurality of data signals from a plurality of distributed coordinated time sources, such as GPS receivers 404. According to an embodiment, processor 406 is configured to process the plurality of data signals received from GPS receivers 404 in order to determine the reported position for each of the GPS receivers 404. Processor 406 is similar to processor 306 of FIG. 3, discussed above. The reported positions provided by GPS receivers 404 are the current spatial coordinates of the plurality of GPS antennas 402. In an embodiment, dual position validator 408 is configured to compute the difference between the reported positions from GPS receivers 404-A and 404-B, and compare the computed difference to a predetermined distance threshold. A distance threshold may be set to 300 meters, for example. Additionally, in an embodiment, the distance between GPS antennas 402-A and 402-B is known and should not change in a significant way, if system 400 is operating as intended. Therefore, in determining if there is a potential GPS spoofing attack on system 200, dual position check unit 204 compares the surveyed-in distance between GPS antennas 402-A and 402-B and the reported distance between GPS antennas 402-A and 402-B, as sent by GPS receivers 404. The comparison produces a distance value which can be compared against the distance threshold. If system 400 is operating as intended (i.e. no spoofing signal), then the difference between the reported distance values and the distance threshold is 0. In other words, the reported distance values would match the distance threshold of 300 meters. In a situation where there is a spoofing attack, a comparison between the reported distance values and the distance threshold would reveal that there is a difference between the two values, according to an embodiment. For example, since the GPS spoofing signal would report the same position for GPS receivers 404-A and 404-B, the reported distance value between GPS receiver 404-A and 404-B would be 0. Hence, when the reported distance value is compared with the distance threshold, dual position check unit 202 would raise a red flag, since the difference is not 300 meters, indicating at least one of the GPS receivers 404 is potential compromised.

Figure 5:
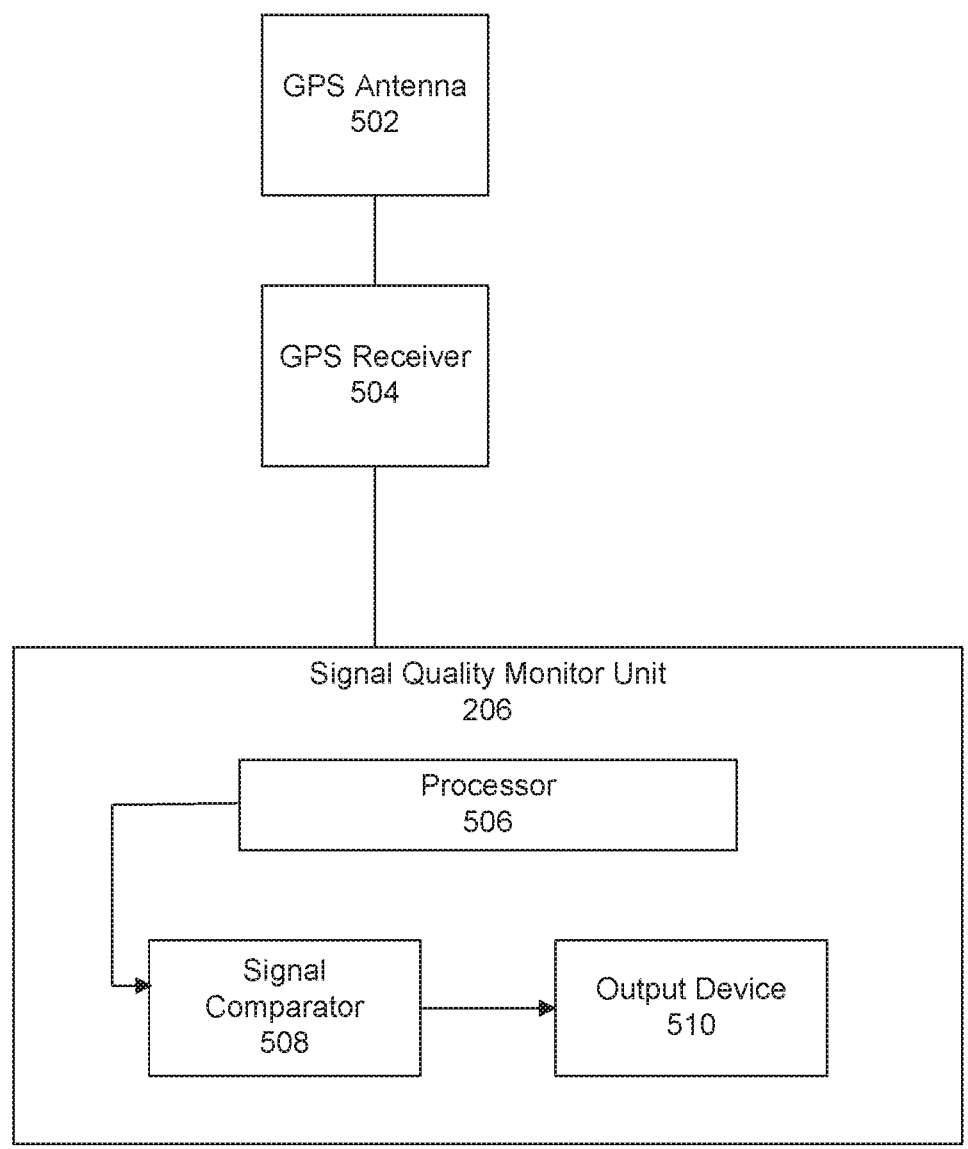
FIG. 5 is a block diagram of a signal quality monitor unit, according to an example embodiment.

More specifically, in an embodiment, dual position comparator 408 is configured to determine if there if the reported positions of GPS receivers 404-A and 404-B is less than the predetermined distance threshold, according to an embodiment. As discussed above, the predetermined distance threshold is associated with the known distance between GPS antennas 402-A and 402-B, as reported by GPS receivers 404-A and 404-B. In the example above, if the difference between the reported positions is less than a predetermined distance threshold, such as 300 meters, then a threat-alert is generated by dual position comparator 408 and sent to output device 410. The threat-alert indicates that the transmission signals of either GPS receiver 404-A or GPS receiver 404-B is compromised. That is, the transmission signals that are reported may indicate the same or substantially same positional coordinates for GPS antennas 402-A and 402-B, which alerts a network operator that a spoofed signal from a GPS spoofer has taken over the output of at least one of the GPS receivers 404. Subsequently, this allows the operator to activate the necessary defense mechanisms against the GPS spoofing attack, Signal Quality Monitor Unit FIG. 5 illustrates a system 500 including a signal quality monitor unit 206. Signal quality monitor unit 206 includes a processor 506, a signal comparator 508, and an output device 510. Signal quality monitor unit 206 can be software, firmware, or hardware or any combination thereof in a computing device. Signal quality monitor unit 206 can be implemented on or implemented with one or more client computing devices.

Signal quality monitor unit 206 is configured to receive data from GPS receiver 504. GPS receiver 504 is configured to measure the relative time delay of signals from a plurality of GPS satellites or antennas 502. The data received from GPS receivers 504 is related to the timing and positioning of GPS antenna 502. Signal quality monitor 206 leverages certain power characteristics about a GPS spoofing signal, in the event of a GPS spoofing attack. As discussed above, GPS spoofing can be detected by monitoring the reported positions from one or more GPS receivers. Another technique that a GPS spoofer utilizes in a spoofing attack is over powering the original or accurate signal of the GPS device, That is, the GPS spoofer would broadcast a spoofing signal that is significantly higher than the accurate signal. One common form of a GPS spoofing attack, commonly termed a carry-off attack, begins by broadcasting signals synchronized with the genuine signals observed by the target GPS receiver. The power of the counterfeit signals is then gradually increased and drawn away from the genuine signals. In this way, the GPS spoofer would overpower the accurate signal and eliminate any of the common distortions that are symptomatic of a GPS spoofing attack. Signal quality monitor unit 206 is configured to combat such an attack by monitoring the power levels of a GPS signal in order to determine discrepancies between an accurate signal and a counterfeit reported signal.

In an embodiment, signal quality monitor 206 is configured to receive data signal a distributed coordinated time source, such as GPS receiver 504. According to an embodiment, processor 506 is configured to process the data received from GPS receiver 504 in order to determine a power measurement for GPS receiver 504. Processor 506 is similar to processor 306 of FIG. 3, discussed above. According to an embodiment, processor 506 is configured to process the data received from GPS receiver 504 in order to determine a symmetric difference measurement and a total in-band power measurement. A symmetric difference measurement and a total in-band power measurement are taken at different intervals of time over a predetermined range of time, according to an embodiment.

A symmetric difference measurement is associated with an auto-correlation function related to the data signal provided by GPS receiver 504. An auto correlation function measures a correlation of the GPS signal from GPS receiver 504 with itself and shifted by a predetermined amount of time delay. The auto-correlation function can be used to detect repeats or periodicity in a signal from GPS receiver 504, for example. According to an embodiment, an auto-correlation function can be used to assess the effect of noise on a periodic signal received from GPS receiver 504. The symmetric difference measures distortions in the auto correlation function that may be caused by spoofing, according to an embodiment. If a symmetric difference measurement is above a predetermined distortion threshold, then this is an indication that GPS receiver 504 has been compromised by a GPS spoofing attack. For example, when system 500 is not compromised, the distortion measurement would be 0 or substantially close to 0. A distortion measurement substantially close to 0 indicates that the reported GPS signal from GPS receiver 504 does not have any distortion outside the expected noise considerations. When a distortion measurement is substantially greater than 0 (i.e. the predetermined distortion threshold), this serves as a red flag to signal quality monitor 206 that the signal of GPS receiver 504 has been spoofed. That is, the distortion of the signal of GPS receiver 504 is outside the expected noise considerations.

A total in-band power measurement of the signal of GPS receiver 504 is a measure of the nominal in-band power level. A total in-band power measurement can be determined based on various power measurement techniques, according to an embodiment. For example, processor 506 can measure the total in-band power of the signal of GPS receiver 504 directly by calculating a power spectral density of the signal utilizing an automatic gain control of GPS receiver 504. The power measurement value can then be passed on to signal comparator 508 for further processing.

According to an embodiment, signal comparator 508 is configured to receive the symmetric difference power measurement and the total in-band power measurement values from processor 506, Signal comparator 508 combines the symmetric difference power measurement and the total in-band power measurement and compares the combined value against values associated with previously recorded or known spoofing attacks. For example, a probability distribution value of the combined symmetric difference power measurement and the total in-band power measurement is determined. If the probability distribution value matches the value associated with the previously recorded or known spoofing attack, then the probability distribution value indicates that GPS receiver 504 is compromised. In such a scenario, a threat-alert is generated by signal comparator 508 and sent to output device 510. The threat-alert indicates that the transmission signals of GPS receiver 504 has been spoofed. That is, the transmission signals that are reported may indicate that the power measurement and distortion measurement of GPS receiver are not accurate. This alerts a network operator that a spoofed signal from a GPS spoofer has taken over the output of GPS receiver 504. Subsequently, this allows the operator to activate the necessary defense mechanisms against the GPS spoofing attack.

Timing Error Measuring Unit

Figure 6:
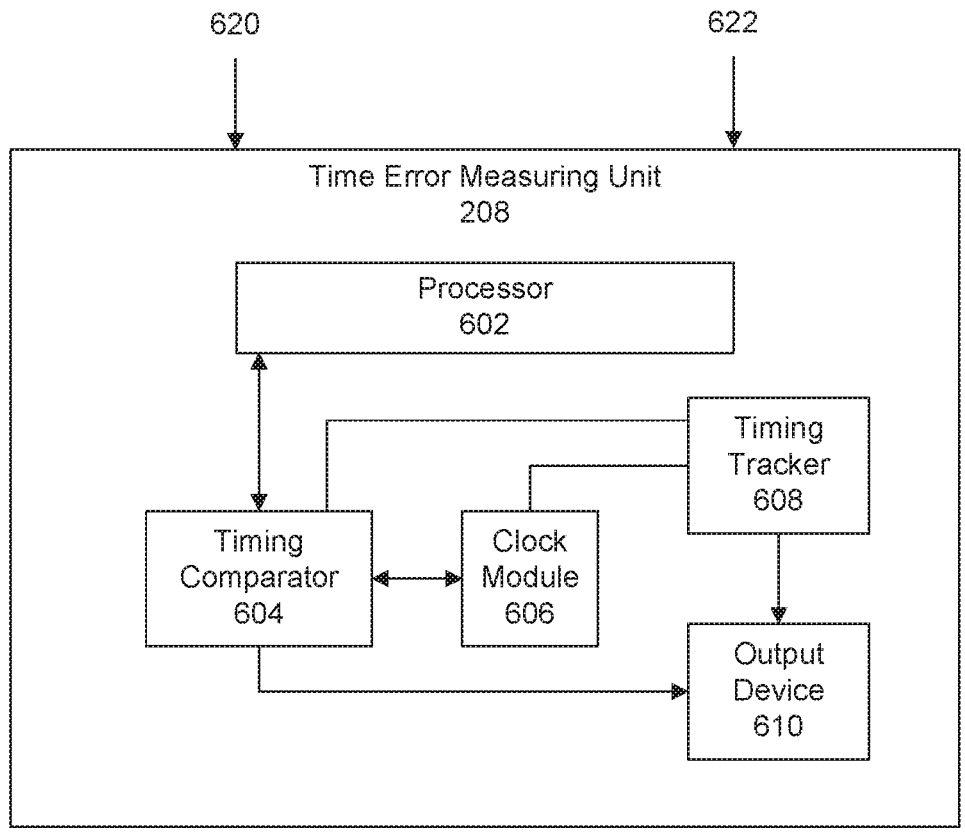
FIG. 6 is a block diagram of a timing error measuring unit, according to an example embodiment.

FIG. 6 is a block diagram of a tuning error measuring unit within a system 600, according to an example embodiment. Timing error measuring unit 208 includes a processor 602, a timing comparator 604, clock module 606, timing tracker 608, and an output device 610. Timing error measuring unit 208 can be software, firmware, or hardware or any combination thereof in a computing device. Timing error measuring unit 208 can be implemented on or implemented with one or more client computing devices. In one example, processor 602 can be a microprocessor, a digital signal processor, a state machine, similar to processor 306 of FIG. 3 discussed above In an embodiment, first data 620 can be a data signal received from a validated data source, such as a cesium atomic clock or in more general terms an atomic clock. The actual time-reference of an atomic clock includes an electronic oscillator operating at microwave frequency and atomic clocks are utilized as validated sources, because such clocks provide the most accurate time and frequency standards known and serve as the primary standard for the definition of the atomic second. In another embodiment, second data 622 can be a data signal received from a distributed coordinated time source, such as GPS or another type of GLASS. An alteration or spoofing of a timing signal from a GPS receiver could result in a compromised system, as discussed above. First data 620 and second data 622 are received by processor 602, which is configured to analyze characteristics of the respective inputs via timing comparator 604, timing tracker 608, and clock module 606. In an embodiment, timing comparator 604 is configured to compare the processed first data with the processed second data for an adjustable interval of time to determine a threat detection value. A threat detection value is utilized to determine if there is a discrepancy or anomaly in the timing or frequency of either the validated data source or the unvalidated data source. According to an embodiment, a threat detection value is calculated based on averaging a first set of data 620 and a second set of data 622 during an adjustable interval of time. Timing and the adjustable interval of time can be controlled by timing tracker 608, according to an embodiment.

In an embodiment, system 600 is susceptible to a frequency offset due to a course quantization on an enhanced capture peripheral (eCap) measurement and a jitter associated with a 1PPS signal. Timing error measuring unit 208 is equipped with an eCap that initiates a counter at the rising edge of the 1 PPS signal being monitored and stops the counter at the subsequent 1 PPS rising edge. The quantization of the eCap measurement is a function of system 600's operating frequency and can be increased by using a faster microcontroller or by using alternative 1 PPS monitoring hardware. The effect of jitter on the 1 PPS signal can be decreased by averaging many 1 PPS measurements together. To assess the impact of averaging, a candidate test statistic $T'_{d,ave}$ is considered, which is defined by the equation (1) below:

$$T^i_{d,ave} = \frac{1}{n_{ave}} \sum_{i=m-n_{ave}}^{m} (N_{i+1} - N_t - f_{nom} * 1s) \quad (1)$$
$$= \frac{1}{n_{ave}}(N_m - N_{m-n_{ave}} - n_{ave} * f_{nom} * 1s)$$

where $n_{ave}$ is the number of difference measurements to average, i is a summation index, and m denotes the most recent eCap measurement index. Equation (1) captures one significant effect of averaging the sequential single second differences: all measurements except the first and last are differenced out. The quantity $(N_m - N_{m-n_{ave}} - n_{ave} * f_{nom} * 1s)$ on the right hand side of Equation (1) is an integer, however, the factor $$\frac{1}{n_{ave}}$$

causes $T'_{d,ave}$ to be a ratio of integers rather than an integer. An integer-valued test statistic can be formed by multiplying both sides of Equation (1) by $n_{ave}$. This test statistic, $T_{d,ave}$, is given by equation (2):

$$T_{d,ave} = \sum_{i=m-n_{ave}}^{m} (N_{i+1} - N_t - f_{nom} * 1s) \quad (2)$$
$$= (N_m - N_{m-n_{ave}} - n_{ave} * f_{nom} * 1s)$$
$$= \overline{N}_m + K - (\overline{N}_{m+n_{ave}} + J) - n_{ave} * f_{nom} * 1s$$
$$= K - J$$

where $J, K$ are integers random values with probability given by Equation 3

In equation (2), frequency offsets between an atomic frequency source and the 1 PPS that are $1/n_{ave}$ lower than the single second difference monitor are accounted for.

In an embodiment, clock module 606 is configured to initiate one or more counters. For example, clock module 606 can be configured to initiate a cycle counter. The cycle counter is configured to count the quantity of cycles of first data 620 received from the validated source during the adjustable interval of time. For example, the adjustable interval of time can be configured to be one second intervals defined by second data 622. During continuous one second intervals, timing comparator 604 is configured to count the quantity of timing pulses generated by the validated time source. In other words, timing comparator 606 is configured to count the number of cycles of first data 620, Timing comparator 604 is configured to analyze second data 622 in order to detect a pulse per second (PPS) received from the unvalidated source. The cycle counter initiated by clock module 608 is subsequently configured to latch to a leading or rising edge of the detected PPS of second data 622. In this manner, clock module 208 is configured to register and record a count of the number of cycles received from the validated data source prior to each time a PPS is detected from the invalidated data source. For each interval, the initiated cycle counter is reset to 0 and a new count is initiated.

Timing comparator 604 is configured to compute a threat detection value based on averaging a comparison between the determined quantity of cycles received during an interval of time and a predetermined expected clock cycle value. For example, when the average of the validated data source and the unvalidated data source are completely in sync with respect to time, the average number of clock cycles from the validated data source during an interval of time can be measured. The measurement serves as the baseline for the entire system, as this is an indication of an ideal operating state of the system. The baseline measurement is used as the predetermined expected clock cycle value, according to embodiments. In an embodiment, the threat detection value can be analyzed using different algorithms in order to detect an anomaly (e.g., a delay lock loop, kalman filter, etc.). For example, a kalman filter, also known as linear quadratic estimation (LQE) algorithm can be used. A kalman filter uses a series of measurements observed over time, containing noise (random variations) and other inaccuracies, and produces estimates of unknown variables that tend to be more precise than those based on a single measurement alone. In embodiment, the kalman filter can operate recursively on streams of noisy input data to produce a statistically optimal estimate of the underlying system state.

Any abnormality or deviation from the baseline measurement or expected clock cycle value serves as a flag to the system indicating a possible threat. Such a threat most likely means that the timing and frequency signals associated with second data 622 are inaccurate. According to an embodiment, timing comparator 604 is configured to compute a delta associated with the average difference between a determined quantity of cycles of first data 620 and the predetermined expected clock cycle value. In other words, a frequency offset between the validated data source and the unvalidated data source is determined. The absolute value of the frequency offset is then assigned to the threat detection value, according to embodiments. In an embodiment, timing comparator 606 is configured to compare the average threat detection value to a configurable threat detection frequency threshold. Such a comparison and threshold are utilized to determine to what extent the validated data source and unvalidated data source are out of sync with respect to the frequency. If the threat detection value meets or exceeds the configurable threat detection frequency threshold, processor 604 generate an alert message which is sent to output device 610 for display to a network operator. The alert message can include the threat detection value, which would indicate the level of disparity between the frequency of the timing signals of the respective first data 620 and second data 622. In this way, a network operator is provided real-time data regarding the frequency characteristics of a system and is immediately alerted to frequency discrepancies, which may serve as an indicator of a compromised GPS receiver. The network operator may then analyze the extent of the anomaly and provide real-time network protection services. According to embodiments, multiple unvalidated timing sources (e.g. GPS GLONASS receiver) and multiple independent validated timing references (e.g. one or more cesium clocks, and Two-way Time Satellite Transfer (TW-STT) systems can be coupled together to increase the robustness of the system (e.g. redundant sources, cross-checking, independent sources).

According to another embodiment, clock module 606 is configured to initiate both a cycle counter and an interval counter. While the cycle counter would operate in a similar manner, as described above, the interval counter would be configured to record a duration of time up to a predetermined interval threshold specified by timing tracker 608. Timing tracker 608 is then configured and utilized to perform the averaging of the first data 620 and the second data 622 by setting the adjustable intervals of time. In this way, timing error measuring unit 208 can be configured to arbitrarily count and average the number of cycles received from first data 620 for a predetermined amount of time. When the count of the interval counter exceeds the predetermined interval threshold, timing comparator 604 is configured to receive the count generated by cycle counter and wait for the additional calculations during the adjustable interval of time, prior to performing the data sample averaging, frequency analysis and spoofing detection, as described above.

Dual Cross Check Unit

Figure 7:
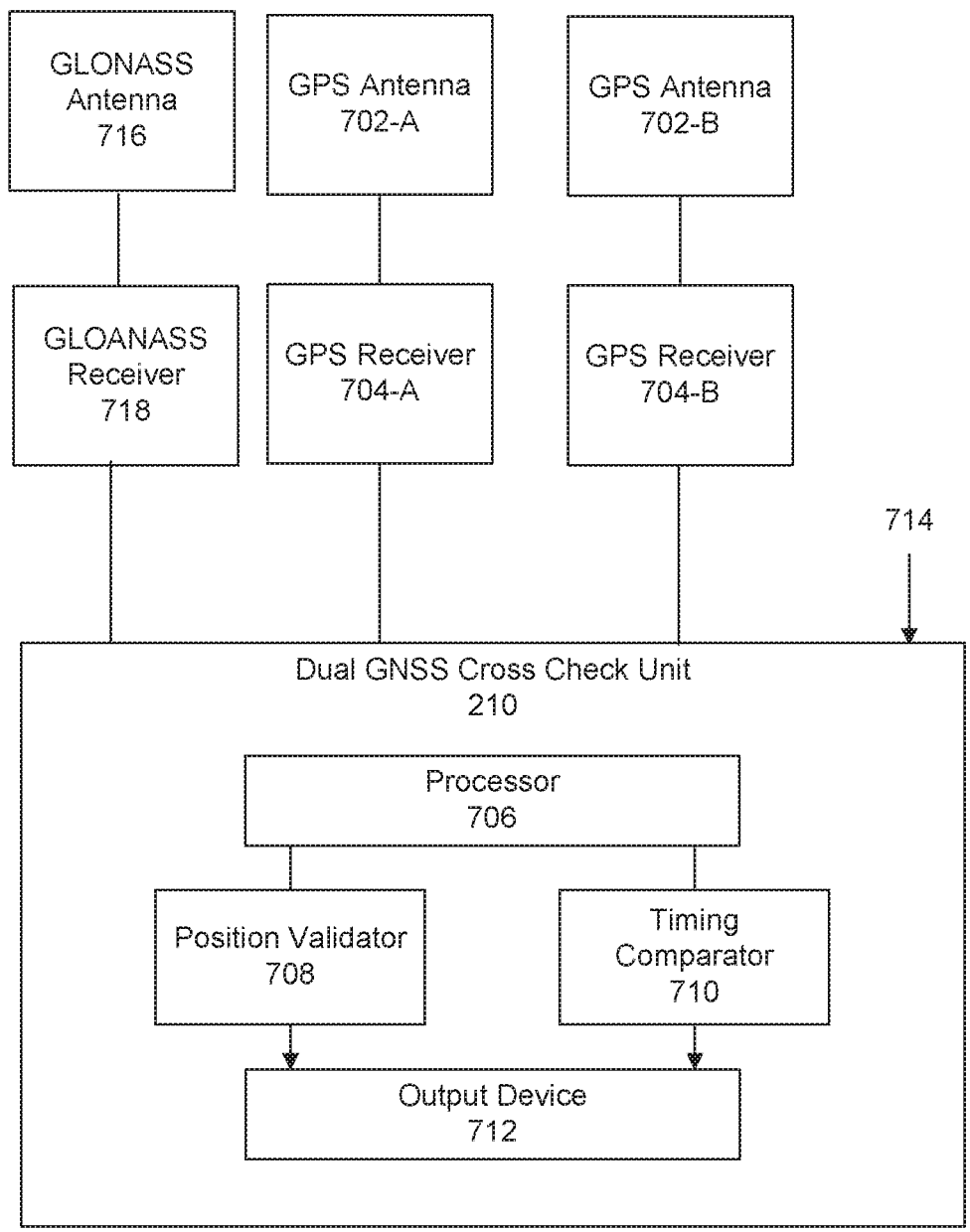
FIG. 7 is a block diagram of a dual cross check unit, according to an example embodiment.

FIG. 7 is a block diagram of a dual GNSS cross check unit 210 within a system 700, according to an example embodiment. Dual GNSS cross check unit 210 includes a processor 706, a timing comparator 710, a position validator 708, and output device 712. Dual GNSS cross check unit 210 can be software, firmware, or hardware or any combination thereof in a computing device. Dual cross check unit 210 can be implemented on or implemented with one or more client computing devices.

Dual GNSS cross check unit 210 is configured to receive a first set of data from GPS receiver 704-A, a second set of data from GPS receiver 704-B and a third set of data 714 from a validated source. Additionally, dual GNSS cross check unit 210 can receive data from GLONASS antenna 716 and GLONASS receiver 718, according to an embodiment. According to an embodiment, position validator 708 is configured to operate similarly to dual position check unit 204 of FIG. 4, while timing comparator 710 is configured to operate similarly to time error measuring unit 208 of FIG. 6. The third set of data 714 from a validated source is similar to first data 620 of FIG. 6. That is, the third set of data 714 can be a data signal received from a validated data source, such as a cesium atomic clock or in more general terms an atomic clock.

According to an embodiment, position validator 708 and timing comparator 710 are configured to perform error detection processing in parallel. In other words, position validator 708 is configured to perform operations similar to dual position check unit 204, as described above, and at the same time, timing comparator 710 is configured to perform operations similar to time error measuring unit 208, as also discussed above.

For example, dual GNSS cross check unit 210 is configured to receive a first set of data from GPS receiver 704-A and a second set of data from GPS receiver 704-B. Position validator 708 leverages the known positional information about GPS receivers 704-A and 704-B and their positional relationship between each other, in order to detect a potential GPS spoofing attack, according to an embodiment. For example, surveyed in positions of GPS receiver 704-A and 704-B are identified. Position validator 708 is configured to detect a spoofing attack by comparing the reported distance between GPS antennas 702-A and 702-B with the known distance between GPS antennas 702-A and 702-B. When the reported distance is below a pre-configured distance threshold, spoofing is detected and a first threat alert is generated. At substantially the same time position validator 708 is validating the positional information from GPS receivers 704-A and 704-B, timing comparator 710 monitors the timing and frequency information associated with the data received from each GPS receiver 704 in relation to the third set of data 714 received from the validated data source. For example, timing comparator 710 is configured to compute a threat detection value based on averaging a comparison between the determined quantity of cycles received during an interval of time and a predetermined expected clock cycle value. For example, when the average of the third set of data 716 and any of GPS receivers 704 are completely in sync with respect to time, the average number of clock cycles from the validated data source during an interval of time can be measured. The measurement serves as the baseline for the entire system, as this is an indication of an ideal operating state of the system. The baseline measurement is used as the average predetermined expected clock cycle value, according to embodiments.

A deviation from the average baseline measurement is indicative of a spoofing attack. According to an embodiment, timing comparator 710 is configured to compute a delta associated with the average difference between a determined quantity of cycles of data received from each of GPS receiver 704 and the predetermined expected clock cycle value. In this way, frequency offsets between the validated data source and each of GPS receiver 704 is determined. The absolute value of the frequency offset is then assigned to different threat detection values for each GPS receiver 704, according to embodiments. In an embodiment, timing comparator 710 is then configured to compare the average threat detection values to a configurable threat detection frequency threshold. Such a comparison and frequency threshold are utilized to determine to what extent the validated data source and any of GPS receivers 704 are out of sync with respect to the frequency. If any of the threat detection values meets or exceeds the configurable threat detection frequency threshold, a second threat alert is generated and sent to output device 712 for display to a network operator. The second threat alert can include the threat detection value for the compromised GPS receiver 704, which would indicate the level of disparity between the frequency of the timing signals.

By generating a first threat alert associated with the positional characteristics of GPS receivers 704 and a second threat alert associated with the frequency and timing signal of GPS receivers 704, dual cross check unit provides a multi-level system of spoofing detection. In this way, a network operator is provided real-time data regarding the positional and frequency characteristics of a system and is immediately alerted to positional and frequency discrepancies, which may serve as an indicator of a compromised GPS receiver.

Mobile Multi-Source Check Unit

Figure 8:
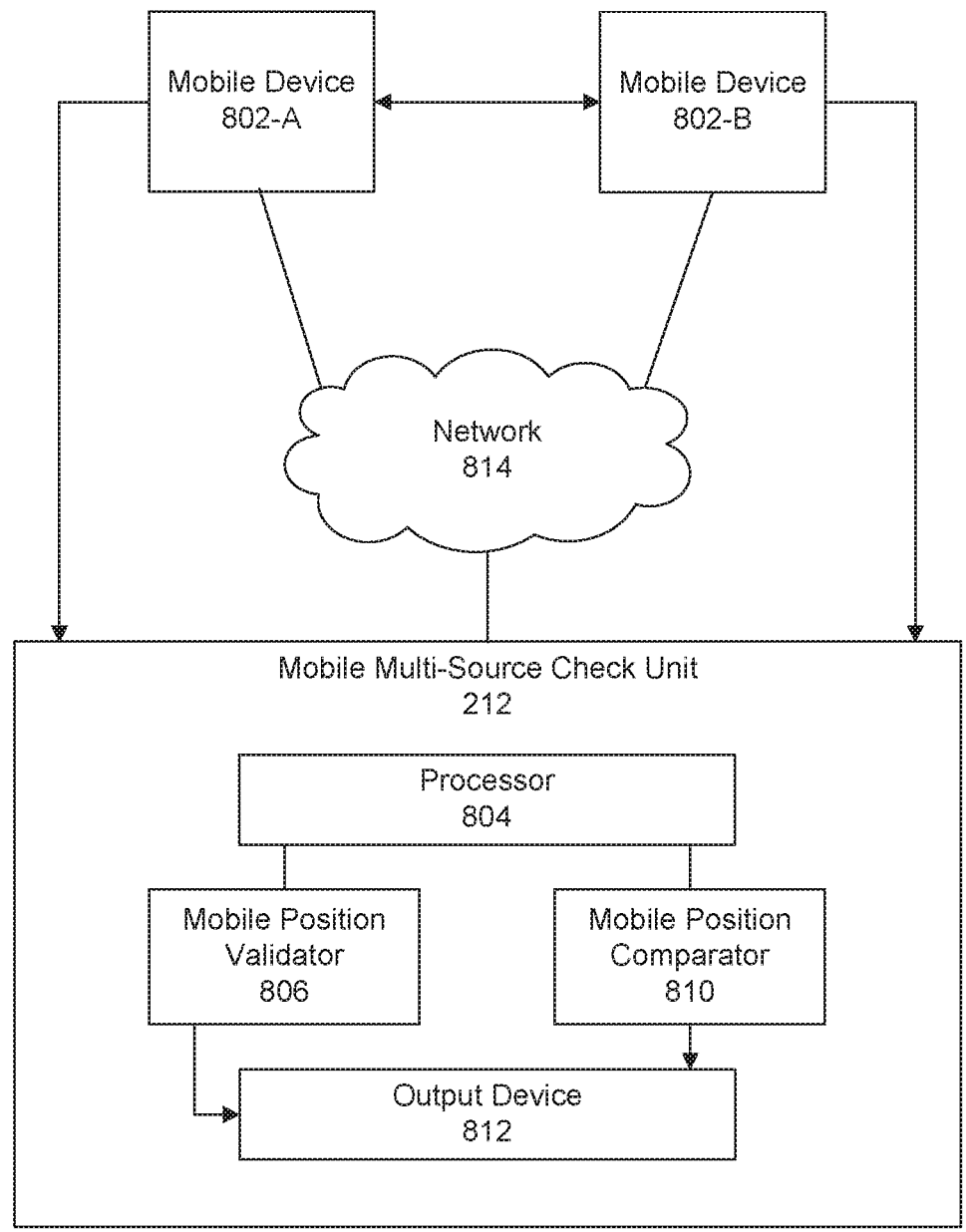
FIG. 8 is a block diagram of a mobile multi-source check unit, according to an example embodiment.

FIG. 8 is a block diagram of a mobile multi-source check unit 212 within a system 800, according to an example embodiment. Mobile multi-source check unit 212 includes a processor 804, a mobile position validator 806, a mobile position comparator 810, and output device 812. Mobile multi-source check unit 212 can be software, firmware, or hardware or any combination thereof in a computing device. Mobile multi-source check unit 212 can be implemented on or implemented with one or more client computing devices.

Mobile multi-source check unit 212 is configured to receive data from a plurality of mobile devices 802 that are communicating via a network 814. Network 814 can be any network or combination of networks that can carry data communication. Such network 814 can include, but is not limited to, a wired (e.g., Ethernet) or a wireless (e.g., and 3G) network. In addition, network 814 can include, but is not limited to, a local area network, medium area network, and/or wide area network such as the Internet. Network 814 can support protocols and technology including, but not limited to, Internet or World Wide Web protocols and/or services. Intermediate network routers, gateways, or servers may be provided between components of system 800 depending upon a particular application or environment. A mobile device 802 can include, but is not limited to, a mobile phone, tablet device, laptop computer, workstation, embedded system, game console, television, set-top box, or any other computing device. Further, a mobile device can include, but is not limited to, a device having a processor and memory for executing and storing instructions. Software may include one or more applications and an operating system. Hardware can include, but is not limited to, a processor, memory and graphical user interface display. The mobile device may also have multiple processors and multiple shared or separate memory components.

Mobile multi-source check unit 212 performs processing similar to stationary position check unit 202 of FIG. 3 and dual position check unit 204, but on a mobile platform. Both detection techniques can be performed substantially in parallel, according to an embodiment. For example, mobile devices 802-A and 802-B can be GPS enabled devices. Hence, mobile devices 802-A and 802-B are susceptible to similar spoofing techniques as described above, in an embodiment, mobile devices 802-A and 802-B can each periodically report their positions to mobile multi-source check unit 212. In response, mobile position validator 806 and mobile position comparator 810 are configured to perform a stationary position check similar to stationary position check unit 202 and a dual position check similar to dual position check unit 204. If the positional characteristics of the GPS signal being received by any of the mobile devices 806 is incorrect, a threat alert is generated and a user of the mobile devices 802 can be notified. Additionally, a network operator may perform certain spoofing defense techniques, such as disabling or suspending the GPS capabilities of the mobile devices 802.

Overview of the Method

Figure 9:
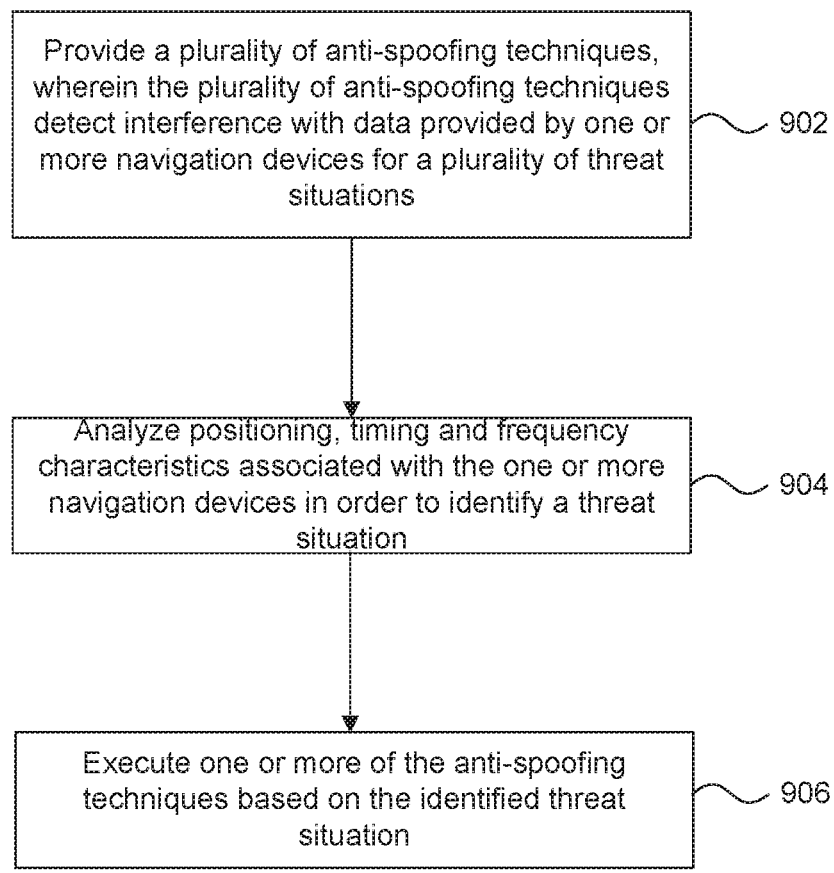
FIG. 9 is a flowchart illustrating a process for a spoofing detection system, according to an example embodiment.

FIG. 9 is a flowchart illustrating a process for a spoofing detection system, according to an example embodiment.

At step 902, a plurality of anti-spoofing techniques are provided. For example, step 902 may be performed by error detection unit 106 of system 100. The plurality of anti-spoofing techniques detect interference with data provided by one or more navigation devices for a plurality of threat situations. Data associated with a plurality of GPS antennas and a plurality of GPS receivers can be monitored to determine if the data is inaccurate. Such inaccuracies may be caused by a spoofing attack. As a result, different anti-spoofing techniques can be provided to alert a network operator, or user of a GPS-dependent device, of a potential spoofing attack.

At step 904, positioning, timing and frequency characteristics associated with the one or more navigation devices are analyzed in order to identify a threat situation. For example, step 904 may be performed by error detection unit 106 of system 100. As discussed above, each of the one or more navigation devices may be susceptible to a spoofing attack. The data signals associated with each of the navigation devices may be monitored periodically over a predetermined time range. The positional, timing and frequency characteristics of the data signals may be extracted and analyzed to determine if there are any inaccuracies in the provided data. For example, baseline positioning, timing and frequency data may be known about the navigation devices. The baseline positioning, timing and frequency data represent the respective values of the data when a system is operating under ideal circumstances (i.e. no spoofing attack). Taking into account nominal statistical noise which may affect said data, any variation from the baseline positioning, timing and frequency data outside of the statistical noise, is an indication that a spoofing attack is ongoing. According to an embodiment, the positioning, timing and frequency characteristics associated with the one or more navigation devices are analyzed substantially in parallel.

At step 906, one or more of the anti-spoofing techniques are executed based on the identified threat situation. For example, step 906 may be performed by error detection unit 106 of system 100. A threat situation is identified based on a quantity of GPS receivers being analyzed in combination with which characteristics of the data signal which are of concern to a network operator, according to an embodiment. For example, a threat situation may be identified based on a stationary GPS receiver, dual GPS receivers at a known fixed distance apart, GPS receivers coupled to a validated data source such as an atomic clock, or mobile devices within a mobile communications network. Once a threat situation is identified, one or more anti-spoofing techniques can be employed. Such anti-spoofing techniques are the error detection mechanisms discussed above and illustrated with FIGS. 3-8, for example. In this way, embodiments are aimed at providing a suite or plurality of error detection or anti-spoofing techniques which can detect interference with signal information from one or a plurality of GPS receivers. The plurality of error detection techniques are capable of detecting interference based on a plurality of different kinds of time-based and position-based threat situations associated with a GPS device.

Figure 10:
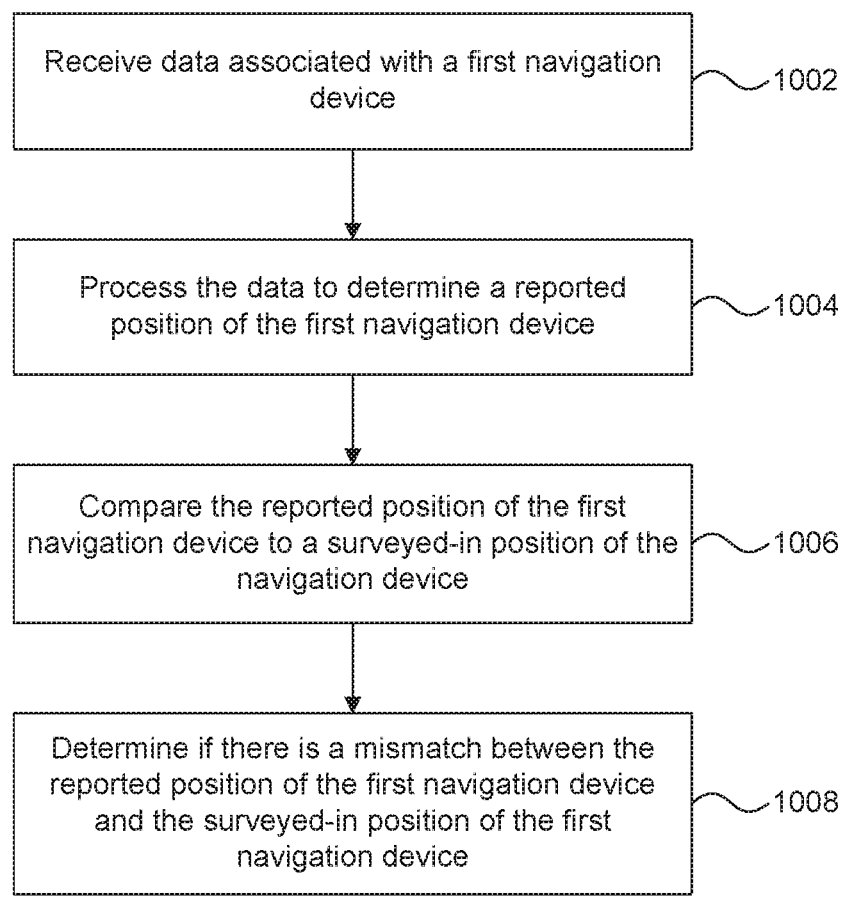
FIG. 10 is a flowchart illustrating a process for a spoofing detection system involving a stationary GPS device, according to an example embodiment.

FIG. 10 is a flowchart illustrating a process for a spoofing detection system involving a stationary GPS device, according to an example embodiment.

At step 1002, data is received from a first navigation device. For example, step 1002 may be performed by stationary position check unit 202 of system 200. A data signal from a distributed coordinated time source, such as a GPS receiver may be received. As discussed above, such distributed coordinated time sources are vulnerable to attacks from adversaries who may attempt to modify or spoof the signal. A modification or spoofing of the signal from a distributed coordinated time source could result in a compromised system that does not operate as intended.

At step 1004, the data is processed to determine a reported position of the first navigation device. For example, step 1004 may be performed by stationary position check unit 202 of system 200. According to an embodiment, the reported position of the first navigation device is the current coordinates of the first navigation device, as identified from the signal reported by a GPS receiver.

At step 1006, the reported position of the first navigation device is compared to a surveyed-in position of the first navigation device. For example, step 1006 may be performed by stationary position check unit 202 of system 200. In an embodiment, the first navigation device is stationary. Therefore, the position and spatial coordinates of the first navigation device are known, fixed and unchanged. The known, fixed position and spatial coordinates of the first navigation device is identified as the surveyed-in position, according to an embodiment. In this way, any difference between the reported position of the first navigation device and the surveyed in position of the first navigation device is indicative of the first navigation device being compromised by a spoofing attack.

At step 1008, a mismatch between the reported position of the first navigation device and the surveyed-in position of the first navigation device is determined. For example, step 1008 may be performed by stationary position check unit 202 of system 200. According to an embodiment, if a mismatch has been determined between the reported and surveyed-in position of the first navigation device, or the difference is outside an acceptable positional range, then a threat-alert is generated. The threat-alert indicates that the transmission signal from the first navigation device is not accurate. That is, the transmission signal may not be the true signal generated by the first navigation device, but instead may be a spoofed signal from a GPS spoofer that has taken over the output of the first navigation device. Under such circumstances, the reported position of first navigation device may correspond to the position of the GPS spoofer or some other inaccurate position, which is not the actual position of the first navigation device. Thus, the discrepancy in the reported position is an indicator to a network operator that the first navigation device is compromised and allows the operator to activate the necessary defense mechanisms against the GPS spoofing attack.

Figure 11:
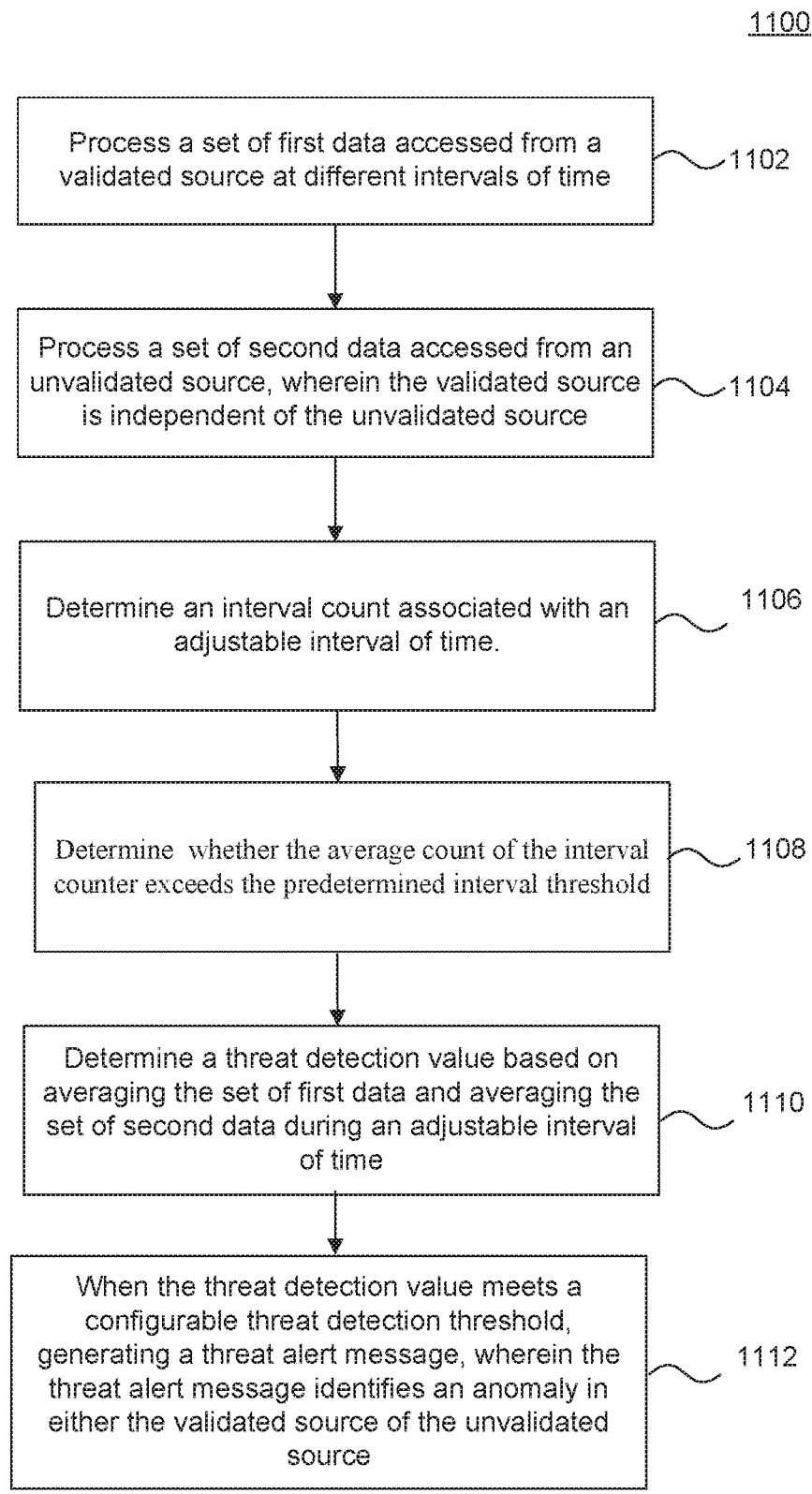
FIG. 11 is a flowchart illustrating a process for a timing and frequency anomaly detection system, according to an example embodiment.

FIG. 11 is a flowchart illustrating a process for a timing and frequency anomaly, detection system, according to an example embodiment.

At step 1102, first data is processed from a validated data source. For example, step 1102 may be performed by timing error measuring unit 208 of system 600, The first data can be a data signal received from a validated data source, such as an cesium atomic clock.

At step 1104, second data is processed from an unvalidated data source. For example step 1104 may be performed by timing error measuring unit 208 of system 600. According to an embodiment, the unvalidated data source is a distributed coordinated time source, such as a GPS that generates the second data. A GPS can include a GPS receiver that measures the relative time delay of signals from a plurality of GPS satellites, which each include onboard cesium atomic clocks. The relative times are transformed into absolute spatial coordinates and a time coordinate.

At step 1106, an interval count associated with an adjustable interval of time is determined. For example, step 1106 may be performed by timing error measuring unit 208 of system 600. In an embodiment, an interval counter can be initiated to record an interval count which represents a duration of time up to a predetermined interval threshold. The predetermined interval threshold can be set by a network operator, for example, based on a type of threat the network operator is trying to detect. For example, a network operator may be aware of certain types of network attacks and how such attacks may affect timing during a specific interval of time. Thus, the network operator can set the interval threshold based on such known threat characteristics. In this way, the timing error measuring unit can be configured to arbitrarily count and report the number of cycles received from a first data for a predetermined amount of time up the predetermined interval threshold. Step 1106 is designed to be repeated so that there can be multiple counts related to the number of cycles received from a first data, which can then be averaged, as described below.

At step 1108, it is determined whether the average count of the interval counter exceeds the predetermined interval threshold. For example, step 1108 may be performed by timing error measuring unit 208 of system 600. When the average of the count of the interval counter exceeds the predetermined interval threshold, method 1100 proceeds to step 1110. When the average count of the interval counter does not exceed the predetermined interval threshold, the interval counter is incremented and step 1108 is repeated while the average number of timing pulses generated by first data are continuously counted and averaged by a separate cycle counter.

At step 1110, the averages of the processed first data is compared with the average of the processed second data to determine a threat detection value. For example, step 1110 may be performed by timing comparator 604 of timing error measuring unit 208.

At step 1112, when the threat detection value meets a configurable threat detection threshold, a threat alert message is generated. For example, step 1112 may be performed by processor 204 of timing error measuring unit 110. A threat detection value is utilized as a flag or indicator to determine if there is a discrepancy or anomaly in the timing or frequency of either the validated data source or the unvalidated data source. A cycle counter may be initiated which counts and averages the amount of cycles received from the validated source during the adjustable interval of time, according to an embodiment. For each interval of time, a measurement of the number of timing pulses generated by the validated data source is recorded. The measuring is continued for a predetermined number of iterations, at which time all of the measurements are aggregated and averaged. The threat detection value is computed based on a relationship between the average determined number of pulses received during an interval of time and an average predetermined expected clock cycle value. The average predetermined expected clock cycle value serves as the baseline for the system when operating without any timing anomalies or frequency offsets. A deviation from the average expected clock cycle would generate a delta which would serve as an indication that there is an anomaly in the frequency of either the validated data source or the unvalidated data source.

Figure 12:
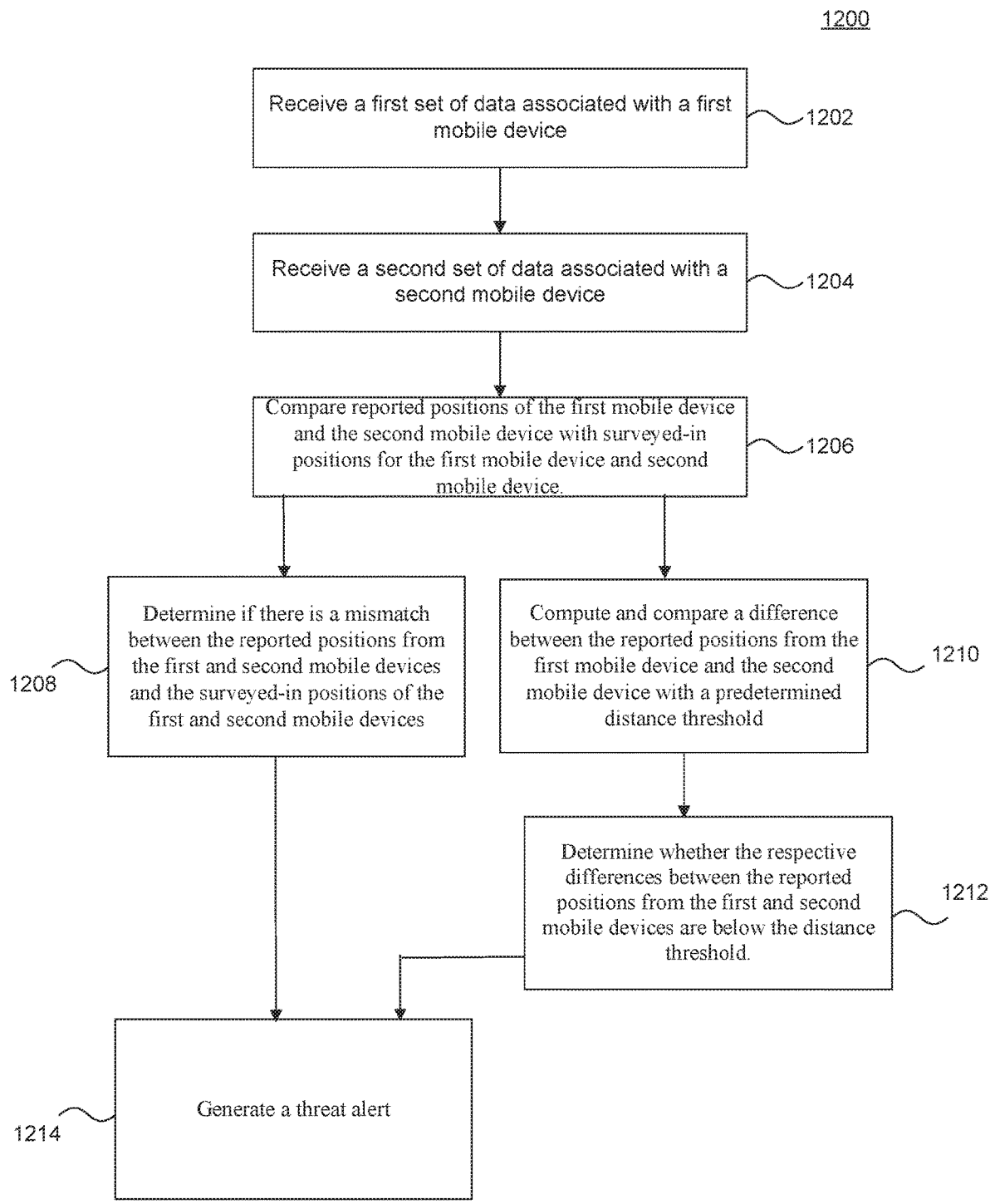
FIG. 12 is a flowchart illustrating a process for a mobile anomaly detection system, according to an example embodiment.

FIG. 12 is a flowchart illustrating a process for a mobile anomaly detection system, according to an example embodiment.

At step 1202, a first set of data is received from a first mobile device and at step 1204, a second set of data is received from a second mobile device. For example, steps 1202 and 1204 may be performed by multi-source check unit 212 of system 800. A first mobile device and a second mobile device within a mobile communications network can be configured to periodically report a respective first set of data and a second set of data associated with the positions and coordinates of the first and second mobile device and/or the position data associated with GPS receivers in communication with the first and second mobile device.

At step 1206, the reported positions of the first mobile device and second mobile device are compared to surveyed-in positions for the mobile devices. For example, step 1206 may be performed by mobile position validator 806 of multi-source check unit 212. The processing of step 1206 is similar to step 1006 of FIG. 10 described above. In this way, the first and second mobile devices in communication with one or more fixed GPS devices can report the positions of the GPS devices and the reported positions can be compared against the known positions of the GPS devices. Any differences between the reported positions associated with the first and second mobile devices and the surveyed in positions for the first and second mobile devices is indicative of the mobile devices being compromised by a spoofing attack.

At step 1208, a mismatch between the reported positions from the first and second mobile devices and the surveyed-in positions of the first and second mobile devices is determined. For example, step 1208 may be performed by mobile position validator 806 of multi-source check unit 212. The processing of step 1208 is similar to step 1008 of FIG. 10 described above. According to an embodiment, if a mismatch has been determined between the reported and surveyed-in positions of the first and second mobile devices, a threat-alert is generated at step 1214. The threat-alert indicates that the GPS devices in communication with the first and second mobile devices are subjected to a spoofing attack.

At step 1210, a difference between the reported positions from the first mobile device and the second mobile device is computed and compared to a predetermined distance threshold. For example, step 1210 may be performed by mobile position comparator 810 of multi-source check unit 212. A distance threshold is utilized when the first and second mobile devices are receiving GPS data from multiple GPS antennas which are positioned a known distance apart. The known distance can be utilized as the distance threshold value, according to an embodiment. When a GPS signal is not spoofed, the reported distances between GPS antennas should remain constant and equal to the distance threshold value. When a spoofing attack is initiated, often the spoofer only reports a single position. As a result, in a situation when there are multiple GPS antennas, a spoofer will report the same position for each of the GPS antennas.

At step 1212, it is determined whether the respective differences between the reported positions from the first and second mobile devices are below the distance threshold. If the difference between the reported positions is less than the distance threshold, this is an indication of a spoofing attack.

At step 1214, a second threat alert is generated. The second threat-alert indicates that the GPS transmission signals received by the first and second mobile devices are compromised, according to an embodiment. A threat alert is generated in response to steps 1208 and step 1212, described above. The threat-alerts indicate that the GPS devices in communication with the first and second mobile devices are compromised by a spoofing attack. In an embodiment, multiple threat alerts may be generated in parallel based on the spoofing scenario that is detected.

Example Computer System

Various embodiments can be implemented, for example, using one or more well-known computer systems, such as computer systems 100 through 800 shown in FIGS. 1-8. Computer system 1300 can be any well-known computer capable of performing the functions described herein, such as computers available from International Business Machines, Apple, Sun, HP, Dell, Sony, Toshiba, etc.

Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1300 also includes user input/output device(s) 1303, such as monitors, keyboards, pointing devices, etc., which communicate with communication infrastructure 1306 through user input/output interface(s) 1302.

Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired, and/or wireless, and which may include any combination of LANs. WANs, the Internet, etc. Control logic and/or data may be transmitted to and from computer system 500 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Figure 13:
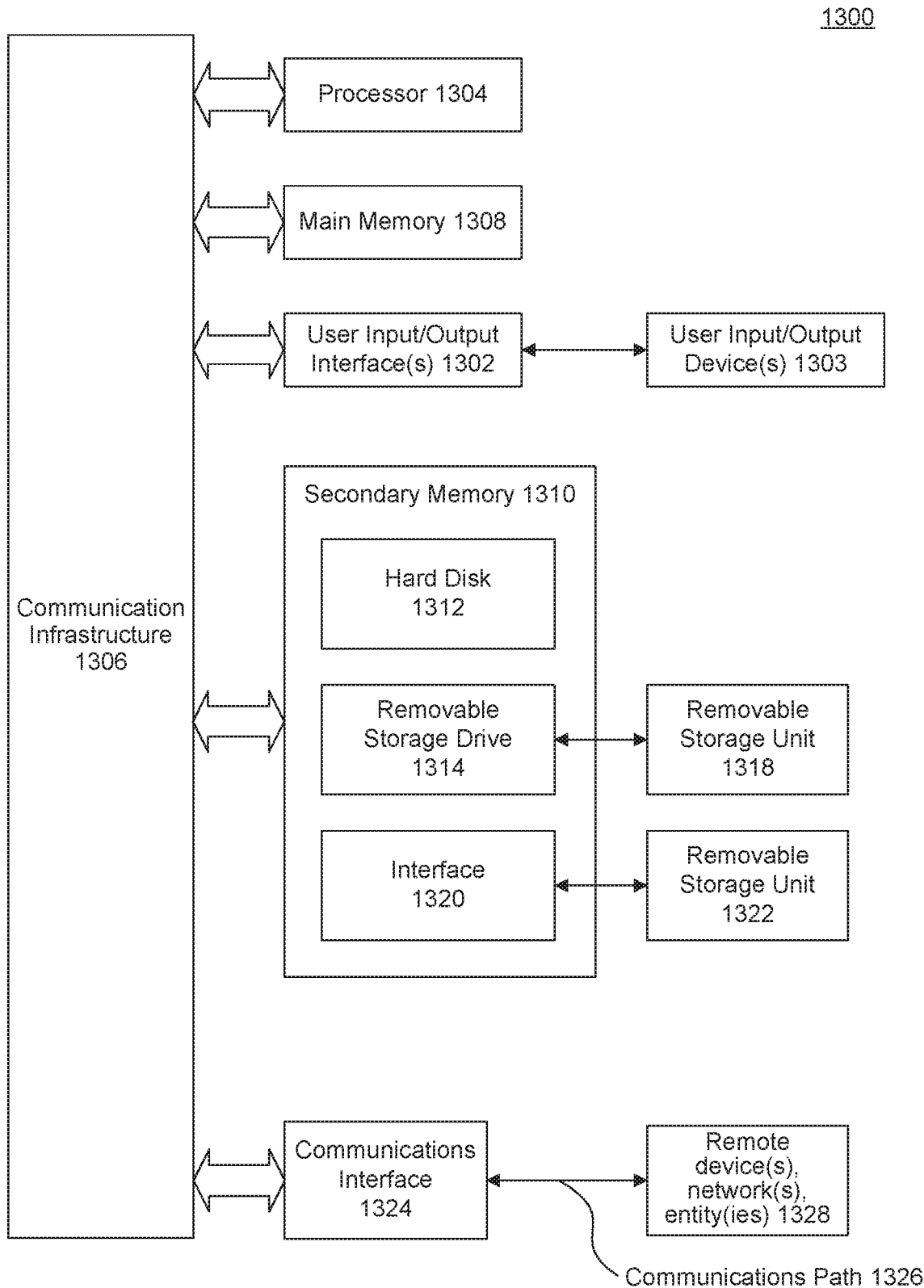
FIG. 13 is an example computer system useful for implementing various embodiments.

Based on the teachings contained in this disclosure, it will be apparent to persons skilled in the relevant art(s) how to make and use the invention using data processing devices, computer systems and/or computer architectures other than that shown in FIG. 13. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   maintaining, by a computing device, an anti-spoofing technique configured to detect interference with data provided by a navigation device for a threat situation, wherein the computing device is configured to receive position information comprising a reported position from each of two or more antennas, including at least a first antenna and a second antenna;
   receiving, by the computing device, a signal, from the navigation device, including at least a first reported position of the first antenna and a second reported position of the second antenna;
   calculating a reported distance between the first reported position of the first antenna and the second reported position of the second antenna;
   determining, based on the calculating, that the first reported position of the first antenna is equal to the second reported position of the second antenna;
   determining a known distance between the two or more antennas, wherein each of the two or more antennas is in a fixed known position;
   calculating a difference between the reported distance and the known distance;
   comparing, by the computing device, the difference to a distance threshold, wherein the difference exceeds the distance threshold;
   identifying, by the computing device, a threat situation based on the difference exceeding the threshold; and
   executing, by the computing device, the anti-spoofing technique based on the identifying of the threat situation.

2. The method of claim 1, wherein received timing characteristics include a time delay of received signals associated with the navigation device, and wherein surveyed-in timing characteristics include a time delay of surveyed-in signals associated with the navigation device.

3. The method of claim 1, further comprising:
   comparing, by the computing device, received power characteristics associated with the navigation device with surveyed-in power characteristics associated with the navigation device,
   wherein the identifying of the threat situation is further based on the comparing of the received power characteristics.

4. The method of claim 1, further comprising:
   determining, by the computing device, that a symmetric difference measurement of the navigation device is at or above a predetermined distortion threshold, wherein the threat situation is identified when the symmetric difference measurement of the navigation device is at or above the predetermined distortion threshold.

5. The method of claim 1, wherein a validated time source is an atomic clock.

6. The method of claim 1, further comprising:
receiving timing characteristics comprising a frequency during a predetermined amount of time; and
receiving surveyed-in timing characteristics comprising a surveyed frequency during the predetermined amount of time.

7. The method of claim 6, wherein the identifying of the threat situation further comprises:
determining a threat detection value based on the comparing of received timing characteristics, and
determining that the threat detection value meets or exceeds a predetermined threat detection frequency value.

8. The method of claim 6, the comparing of the received timing characteristics comprises:
transforming the received timing characteristics associated with the navigation device and to a received spatial coordinate associated with the navigation device;
transforming the surveyed-in timing characteristics associated with the navigation device to a surveyed-in spatial coordinate associated with the navigation device; and
comparing the received spatial coordinate to the surveyed-in spatial coordinate.

9. The method of claim 8, the comparing the received spatial coordinate to the surveyed-in spatial coordinate comprising:
identifying a mismatch between the received spatial coordinate and the surveyed-in spatial coordinate, respectively; and
determining that the mismatch exceeds an acceptable spatial threshold.

10. The method of claim 1, further comprising:
comparing, by the computing device, received positioning characteristics associated with the navigation device with surveyed-in positioning characteristics associated with the navigation device,
wherein the identifying is further based on the comparing of the received positioning characteristics.

11. The method of claim 10, wherein the comparing of the timing characteristics and the comparing of the positioning characteristics is performed in parallel.

12. The method of claim 1, further comprising:
comparing, by the computing device, received frequency characteristics associated with the navigation device with surveyed-in frequency characteristics associated with the navigation device,
wherein the identifying is further based on the comparing of the received frequency characteristics.

13. The method of claim 1, further comprising:
generating, by the computing device, a threat alert based on the identifying of the threat situation.

14. The method of claim 1, further comprising:
comparing, by the computing device, received timing characteristics associated with the first time source of a second navigation device corresponding to a first one of the antennas with surveyed-in timing characteristics associated with the second time source of the second navigation device corresponding to a second one of the antennas.

15. A system, comprising:
a memory; and
at least one processor coupled to the memory and configured to:
maintain an anti-spoofing technique configured to detect interference with data provided by a navigation device for a threat situation, wherein the computing device is configured to receive position information comprising a reported position from each of two or more antennas, including at least a first antenna and a second antenna;
receive a signal, from the navigation device, including at least a first reported position of the first antenna and a second reported position of the second antenna indicating a reported position of the navigation device;
calculate a reported distance between the first reported position of the first antenna and the second reported position of the second antenna;
determining, based on the calculation, that the first reported position of the first antenna is equal to the second reported position of the second antenna;
determine a known distance between the two or more antennas, wherein each of the two or more antennas is in a fixed known position;
calculate a difference between the reported distance and the known distance;
compare the difference to a distance threshold, wherein the difference exceeds the distance threshold;
identify a threat situation based on the difference exceeding the threshold; and
execute the anti-spoofing technique based on the identifying of the threat situation.

16. The system of claim 15, wherein to compare the received timing characteristics, the at least one processor is configured to:
transform received timing characteristics associated with the navigation device to a received spatial coordinate associated with the navigation device; and
transform surveyed-in timing characteristics associated with the navigation device to a surveyed-in spatial coordinate associated with the navigation device;
compare the received spatial coordinate to the surveyed-in spatial coordinate.

17. The system of claim 16, wherein, the at least one processor is configured to:
identify a mismatch between the received spatial coordinate and the surveyed-in spatial coordinate, respectively; and
determine that the mismatch exceeds an acceptable spatial threshold.

18. A non-transitory computer-readable device having instructions stored thereon that, when executed by at least one computing device, cause the at least one computing device to perform operations comprising:
maintaining an anti-spoofing technique configured to detect interference with data provided by a navigation device for a threat situation, wherein the computing device is configured to receive position information comprising a reported position from each of two or more antennas, including at least a first antenna and a second antenna;
receiving a signal, from the navigation device, including at least a first reported position of the first antenna and a second reported position of the second antenna indicating a reported position of the navigation device;
calculating a reported distance between the first reported position of the first antenna and the second reported position of the second antenna;

determining, based on the calculating, that the first reported position of the first antenna is equal to the second reported position of the second antenna determining a known distance between the two or more antennas, wherein each of the two or more antennas is in a fixed known position;

calculating a difference between the reported distance and the known distance;

comparing the difference to a distance threshold, wherein the difference exceeds the distance threshold;

identifying a threat situation based on the difference exceeding the threshold; and executing the anti-spoofing technique based on the identifying of the threat situation.

19. The method of claim 1, wherein the identifying comprises:

identifying, by the computing device, the threat situation based on the determination that first reported position of the first antenna is equal to the second reported position of the second antenna.

20. The method of claim 1, wherein the anti-spoofing technique comprises one of disabling or suspending GPS abilities of a mobile device from which the first reported position of the first antenna or the second reported position of the second antenna was received.

* * * * *